(12) United States Patent
Miyazaki

(10) Patent No.: US 6,836,200 B2
(45) Date of Patent: Dec. 28, 2004

(54) CONVERGENCE YOKE

(75) Inventor: Masahiko Miyazaki, Daito (JP)

(73) Assignees: Sanyo Electric Co., Ltd., Moriguchi (JP); Sanyo Electronic Components Co., Ltd., Daito (JP)

( * ) Notice: Subject to any disclaimer, the term of this patent is extended or adjusted under 35 U.S.C. 154(b) by 75 days.

(21) Appl. No.: 10/397,178

(22) Filed: Mar. 27, 2003

(65) Prior Publication Data

US 2003/0184420 A1 Oct. 2, 2003

(30) Foreign Application Priority Data

Mar. 28, 2002 (JP) ........................................ 2002-090331

(51) Int. Cl.[7] .............................................. H01F 7/00
(52) U.S. Cl. ...................................... 335/213; 313/440
(58) Field of Search ................................ 335/210–214; 313/440

(56) References Cited

U.S. PATENT DOCUMENTS

| | | | | |
|---|---|---|---|---|
| 3,619,500 A | * | 11/1971 | Bouley et al. | 348/208.14 |
| 3,849,749 A | * | 11/1974 | Kadota | 335/210 |
| 4,396,897 A | * | 8/1983 | Sluijterman et al. | 335/212 |
| 4,412,194 A | * | 10/1983 | Chase | 335/210 |
| 4,961,021 A | * | 10/1990 | Oguro et al. | 313/412 |
| 6,066,913 A | * | 5/2000 | Choi et al. | 313/440 |
| 6,069,546 A | * | 5/2000 | Azzi et al. | 335/210 |
| 6,351,200 B1 | * | 2/2002 | Azzi et al. | 335/213 |
| 6,411,027 B1 | * | 6/2002 | Sluyterman et al. | 313/440 |
| 6,608,436 B1 | * | 8/2003 | Sluyterman et al. | 313/440 |
| 6,630,803 B1 | * | 10/2003 | Sluyterman et al. | 315/368.11 |

* cited by examiner

Primary Examiner—Ramon M. Barrera
(74) Attorney, Agent, or Firm—Armstrong, Kratz, Quintos, Hanson & Brooks, LLP

(57) ABSTRACT

A convergence yoke embodying the present invention produces two-pole magnetic field for deflecting the electron beam in a horizontal direction or a vertical direction, and comprises a ring core 1 having a horizontal coil 2 and a vertical coil 3 wound therearound. With the horizontal coil 2 and the vertical coil 3, winding density distribution wherein winding angle θ from each of a horizontal coil reference axis 20 and a vertical coil reference axis 30 is a variable is in proportion to $\cos^2 \theta$, whereby magnetic field strength distribution becomes more uniform than conventionally.

4 Claims, 14 Drawing Sheets

FIG. 24(a) PRIOR ART
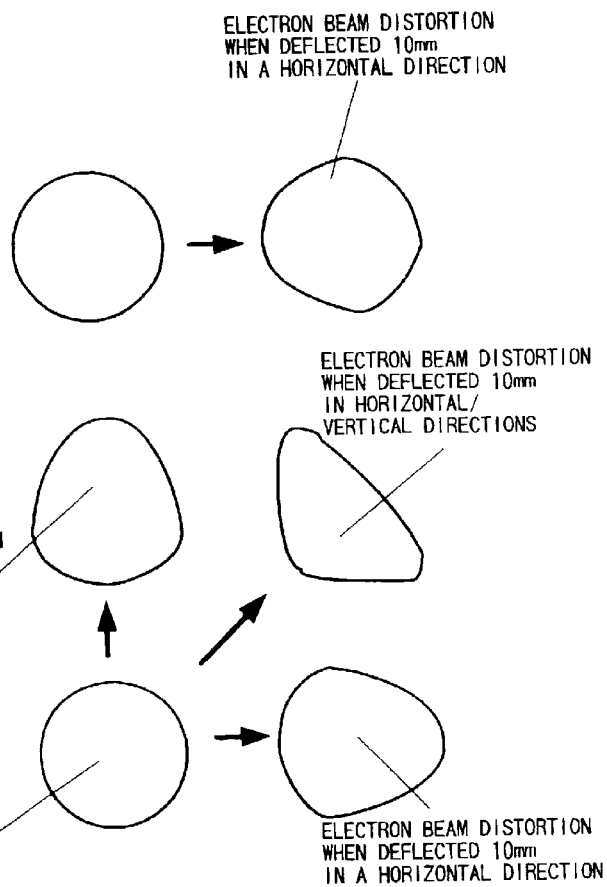
FIG. 24(b) PRIOR ART
FIG. 25 PRIOR ART
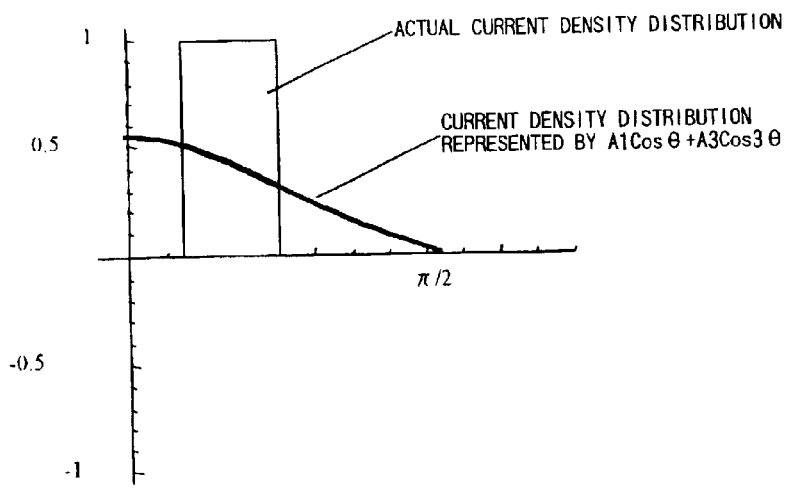

CONVERGENCE YOKE

FIELD OF THE INVENTION

The present invention relates to convergence yokes which are fixed to a cathode-ray tube of projection televisions and the like and produce two-pole magnetic field for deflecting an electron beam in a horizontal direction or a vertical direction.

BACKGROUND OF THE INVENTION

With reference to FIG. 1, a convergence yoke comprises a ring core 1 having a horizontal coil 2 and a vertical coil 3 wound therearound. A horizontal convergence correction circuit 4 is connected to the horizontal coil 2. A vertical convergence correction circuit 5 is connected to the vertical coil 3. With the convergence yoke, producing uniform magnetic field within the electron beam passing area is required for suppressing the electron beam distortion caused by the deflection to improve focus performance.

It is proposed, according to the literature "SEMINAR M-4 1991 SID 'Deflection And Convergence Technology' Basab B. Dasgupta, Sony Corporation, San Diego, Calif.", that winding density distribution of the coil wherein the winding angle θ from the reference axis of the ring core is a variable is in proportion to cos θ, whereby the magnetic field within the ring core is made uniform.

Further, Japanese Patent No. 3039988 proposes a convergence yoke wherein ratio A3/A1 of a coefficient (Ak coefficient) when winding distribution is expanded in Fourier series is 0.13 to 0.50 in order to render the magnetic field strength distribution uniform.

However, with use of computer simulation, the present inventor has calculated the magnetic field strength distribution of the horizontal coil of the convergence yoke wherein the winding density distribution of the coil is in proportion to cos θ, revealing that contour lines of the magnetic field strength in the ring core are shaped in oblong ellipses as shown in FIG. 20, and particularly the magnetic field strength has nonuniformity on an upper and lower portions of the electron beam passing area. Thus the electron beam has a gross distortion of a circular shape in cross section as shown in FIG. 24(a).

Furthermore, the present inventor, with use of computer simulation, has calculated the magnetic field strength distribution of the horizontal coil of the convergence yoke wherein ratio A3/A1 of Ak coefficient is 0.13 to 0.50, and winding is provided uniformly in the range of 15° to 40° in winding angle θ from the reference axis (the construction according to claim 2 of the patent stated above), with the result that the magnetic field strength is not uniform at each of four corners as shown in FIG. 21.

Further, in the case where the winding range of the convergence yoke is shifted 0.5°, i.e. the winding is provided uniformly in the range of 15.5° to 40.5° in winding angle θ from the reference axis, the present inventor calculates the magnetic field strength distribution of the horizontal coil with use of computer simulation, to obtain the magnetic field strength distribution shown in FIG. 22. In this case whereas ratio A3/A1 of Ak coefficient is 0.1 departing from the scope of the invention of the patent stated above, the magnetic field strength distribution obtained is slightly more uniform than that shown in FIG. 21. Accordingly, it is not always true that ratio A3/A1 of Ak coefficient is most preferably in the range of 0.13 to 0.50.

Further, with use of computer simulation the present inventor calculates the magnetic field strength distribution of the horizontal coil of the convergence yoke wherein the winding is provided uniformly in the range of 10° to 30° in winding angle θ from the reference axis (the construction according to claim 3 of the patent stated above), to obtain the magnetic field strength distribution shown in FIG. 23. As illustrated, the magnetic field strength is extremely uneven, causing the electron beam to be distorted grossly as shown in FIG. 24(b).

Furthermore, even if ratio A3/A1 of Ak coefficient is in the range of 0.13 to 0.50, the magnetic field strength distribution varies greatly within this range, so that in designing the convergence yoke the coil performance cannot be determined unless the deformation caused by the deflection of the electron beam is actually measured. Presumably, the reason is that the current density distribution represented by the sum of two terms, A1 and A3 of Fourier series, is greatly shifted from the actual current density distribution, as shown in FIG. 25, so that the coil performance cannot be determined only by ratio A3/A1 of Ak coefficient.

As described above, prior art has the problem that the winding distribution having the uniform magnetic field strength cannot be determined uniquely.

SUMMARY OF THE INVENTION

An object of the present invention is to provide a convergence yoke having more uniform magnetic field strength than conventionally.

A convergence yoke embodying the present invention is characterized in that the convergence yoke comprises a ring core having a plurality of coils wound therearound, and winding density distribution of each of the coils wherein winding angle θ from a reference axis of the ring core is a variable is in proportion to $\cos^2 \theta$.

As compared with a conventional convergence yoke wherein winding density distribution of a coil is in proportion to cos θ, the convergence yoke of the invention is greatly reduced in density as angle θ is increased as shown in FIG. 5, so that an oblong ellipse of the magnetic field strength distribution shown in FIG. 20 is extended upward and downward, rendering the magnetic field strength distribution shaped in concentric circles. As a result, the magnetic field strength distribution is uniform over electron beam passing area, and a cross section shape of the electron beams will not be grossly distorted owing to the deflection.

Stated specifically, the ring core 1 has wound therearound a horizontal coil 2 and a vertical coil 3 based on a horizontal coil reference axis 20 and a vertical coil reference axis 30 which are orthogonal to each other. Each of the two coils 2, 3 has the winding density distribution described.

Further stated specifically, the plurality of coils each comprises a plurality of coil portions. Each of the coil portions is wound within a predetermined angle range wherein a winding center is in the range of 25° to 30° in winding angle θ from the reference axis on each of quadrants of orthogonal coordinates, and has winding density distribution in proportion to $\cos^2 \theta$ within the angle range. According to the specific construction, the magnetic field strength distribution comprising diamond-shape contour lines is obtained, whereby the uniformity of the magnetic field strength becomes higher than conventionally.

Another convergence yoke of the present invention is characterized in that the yoke comprises a ring core having a plurality of coils wound therearoud, each of the coils comprises a plurality of coil portions, each coil portion is wound uniformly at a first winding density X1 within a predetermined angle range (θs to θe) wherein a winding center is in the range of 25° to 30° in winding angle θ from the reference axis on each of quadrants of orthogonal coordinates and is wound uniformly at a second winding density X2 within an angle range (0 to θs) from 0° to the predetermined angle range in winding angle θ, ratio of the second winding density X2 relative to the first winding density X1 is represented by an expression given below.

$$X2/X1=((\cos^2 \theta s - \cos^2 \theta e)/2 \cos^2 \theta s) \pm 0.1$$

The convergence yoke described above has approximately uniform magnetic field strength distribution which is equivalent to that of a convergence yoke having winding density distribution in proportion to $\cos^2 \theta$ within the predetermined angle range (θs to θe) wherein a winding center is in the range of 25° to 30° in winding angle θ from the reference axis.

As described above, with the convergence yoke of the present invention, winding distribution wherein the magnetic field strength distribution is more uniform than conventionally can be determined uniquely, whereby the distortion of the electron beam caused by the deflection is suppressed, and focus performance is improved.

BRIEF DESCRIPTION OF THE DRAWINGS

FIGS. 24(a) and 24(b) are diagrams showing the distortion of the electron beam with the conventional convergence yoke;

FIG. 25 is a graph showing comparison between current density distribution set at the conventional convergence yoke and actual current density distribution.

DETAILED DESCRIPTION OF EMBODIMENTS

Figure 1:
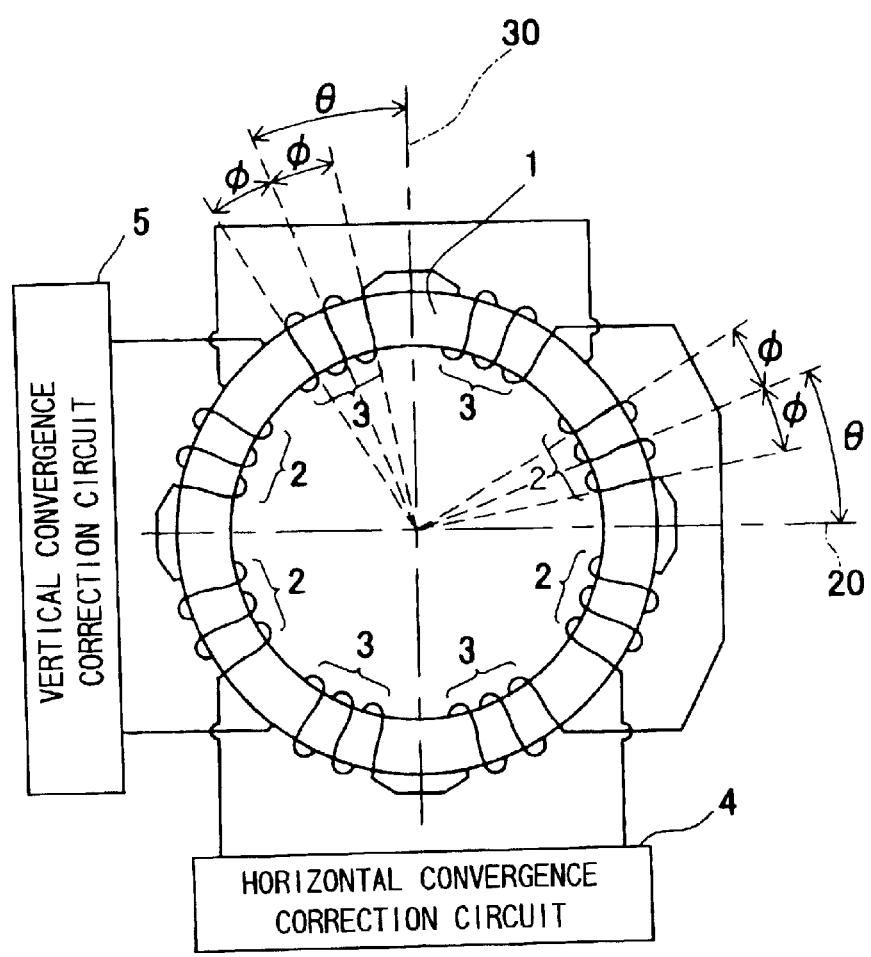
FIG. 1 is a diagram showing a convergence yoke embodying the present invention.

An embodiment of the present invention will be described below in detail with reference to the drawings. A convergence yoke of the invention comprises a ring core 1 having wound therearound a horizontal coil 2 and a vertical coil 3, as shown in FIG. 1. A horizontal convergence correction circuit 4 is connected to the horizontal coil 2, and a vertical convergence correction circuit 5 is connected to the vertical coil 3. With the horizontal coil 2 and the vertical coil 3, winding density distribution of each of the coils wherein a winding angle θ from a horizontal and a vertical coil reference axis 20, 30 is a variable is in proportion to $\cos^2 \theta$.

Figure 6:
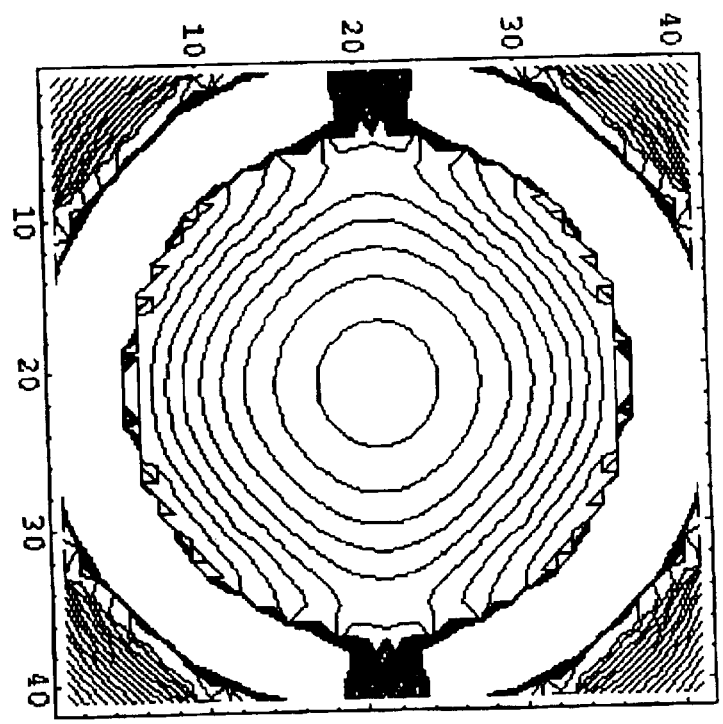
FIG. 6 is a diagram showing horizontal deflection magnetic field strength distribution of the convergence yoke of the invention wherein winding density distribution is in proportion to $\cos^2 \theta$.

With use of computer simulation the present inventor calculates the magnetic field strength distribution of the convergence yoke having a horizontal coil wound around an entire periphery of the ring core at the winding density distribution described. FIG. 6 shows the calculation result. As illustrated the magnetic field strength distribution is shown by concentric circles shape, and spacing between contour lines is broad and uniform. The magnetic field strength distribution suppresses the distortion of electron beam caused by the deflection, improving focus performance.

Each of the horizontal coil 2 and the vertical coil 3 needs to be wound within a limited angle range for winding the two coils around the ring core 1 without the coils overlapped. According to the present invention, in order to determine the most preferable winding angle position, with use of computer simulation, the variations of the magnetic field strength distribution are investigated, in the case where winding angle position (winding center position) of the horizontal coil having one turn is varied.

Figure 12:
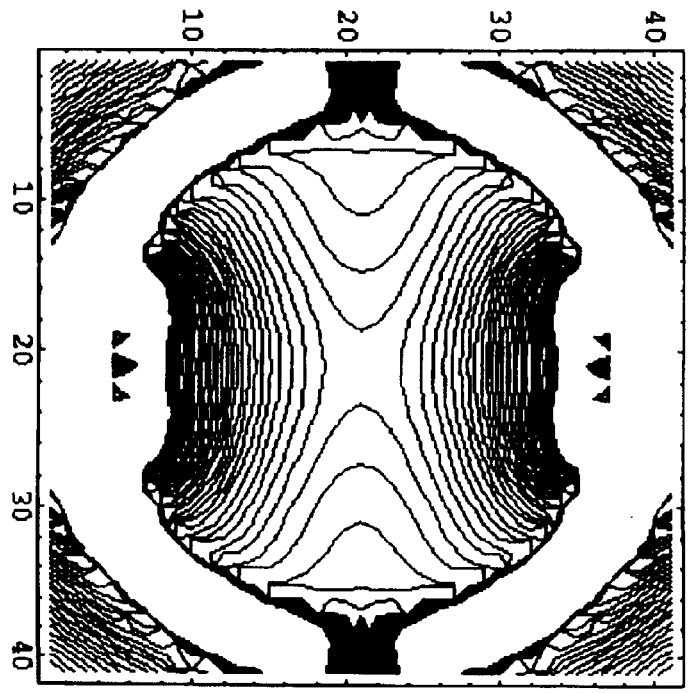
FIG. 12 is a diagram showing horizontal deflection magnetic field strength distribution in the case where winding angle position is 10°.
Figure 13:
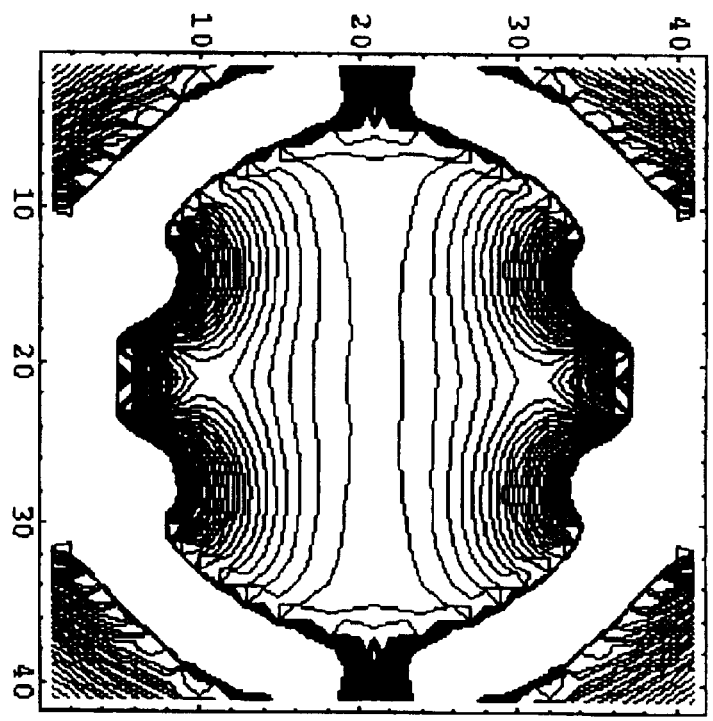
FIG. 13 is a diagram showing horizontal deflection magnetic field strength distribution in the case where winding angle position is 20°.
Figure 14:
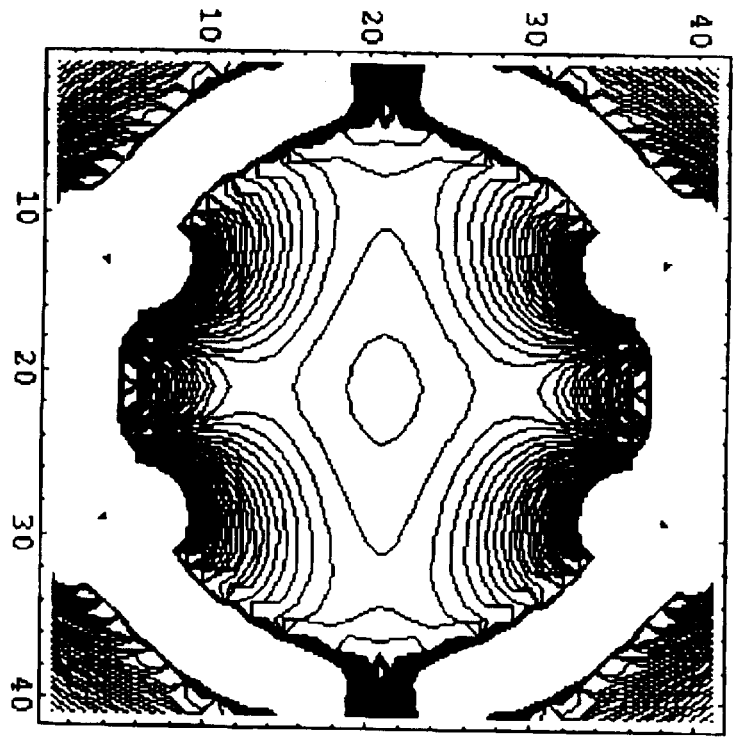
FIG. 14 is a diagram showing horizontal deflection magnetic field strength distribution in the case where winding angle position is 25°.
Figure 15:
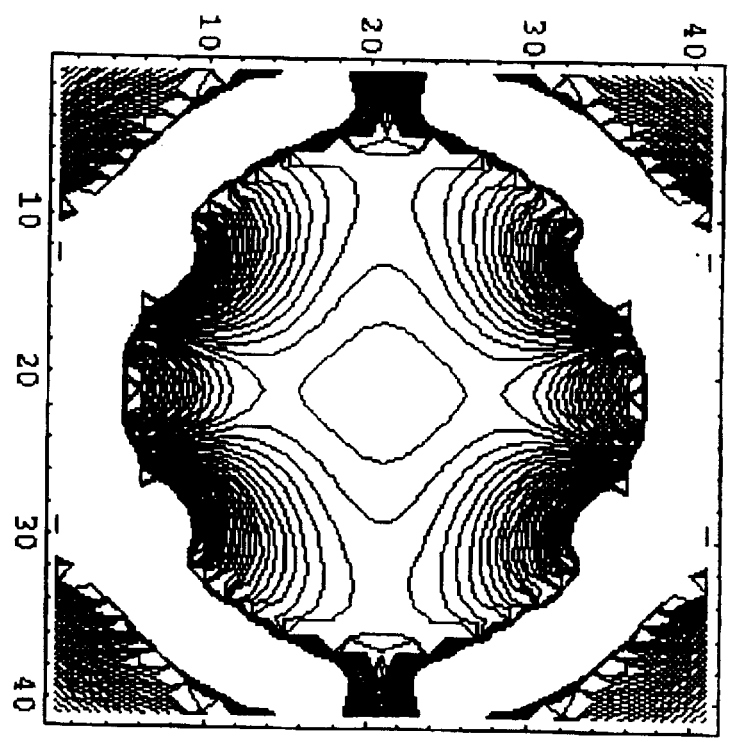
FIG. 15 is a diagram showing horizontal deflection magnetic field strength distribution in the case where winding angle position is 27.5°.
Figure 16:
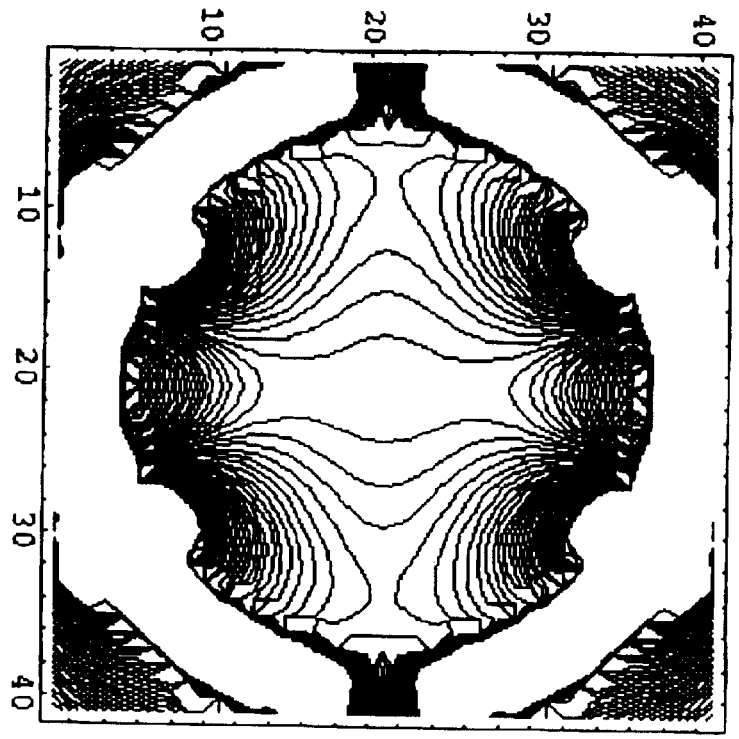
FIG. 16 is a diagram showing horizontal deflection magnetic field strength distribution in the case where winding angle position is 30°.
Figure 17:
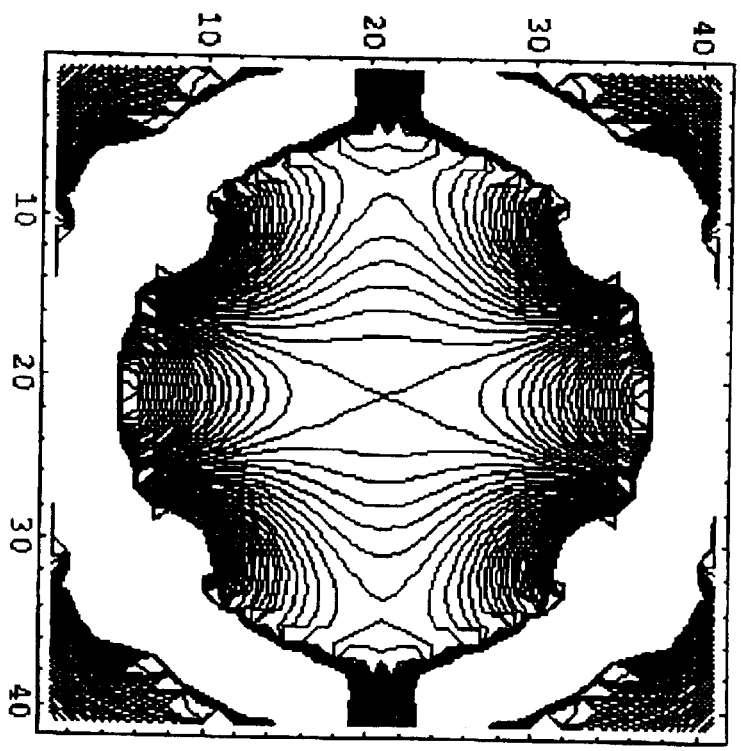
FIG. 17 is a diagram showing horizontal deflection magnetic field strength distribution in the case where winding angle position is 35°.
Figure 18:
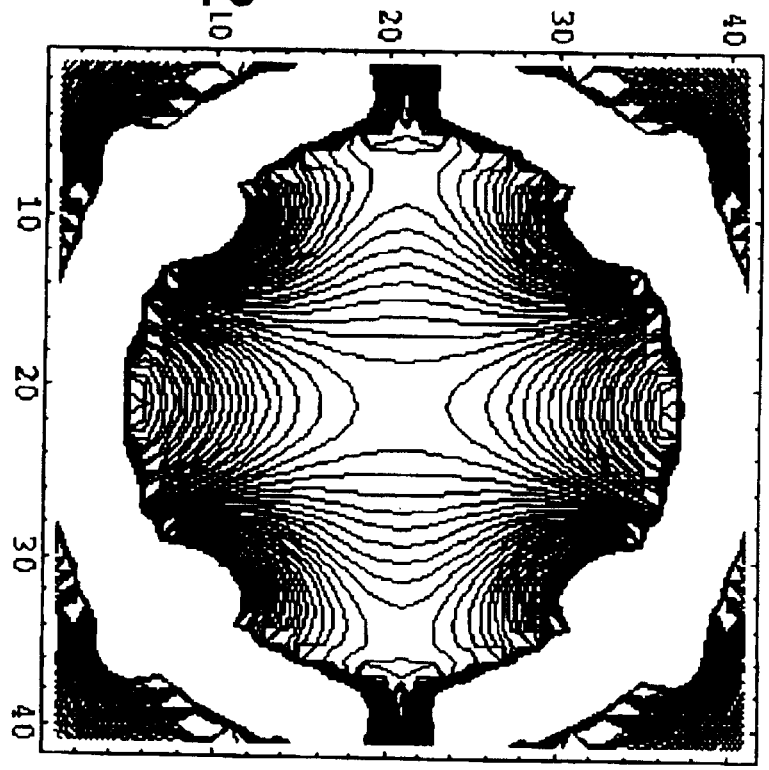
FIG. 18 is a diagram showing horizontal deflection magnetic field strength distribution in the case where winding angle position is 40°.
Figure 19:
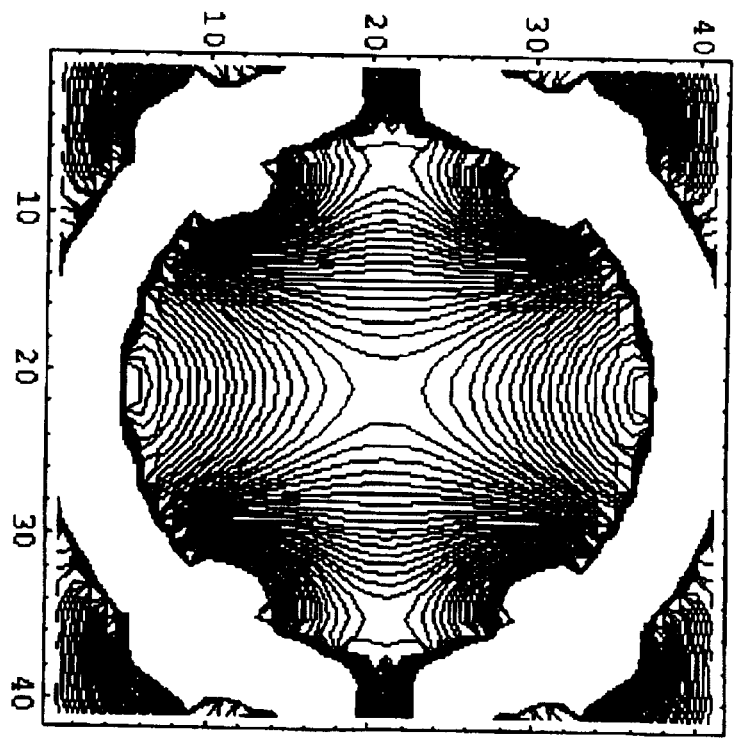
FIG. 19 is a diagram showing horizontal deflection magnetic field strength distribution in the case where winding angle position is 50°.
Figure 20:
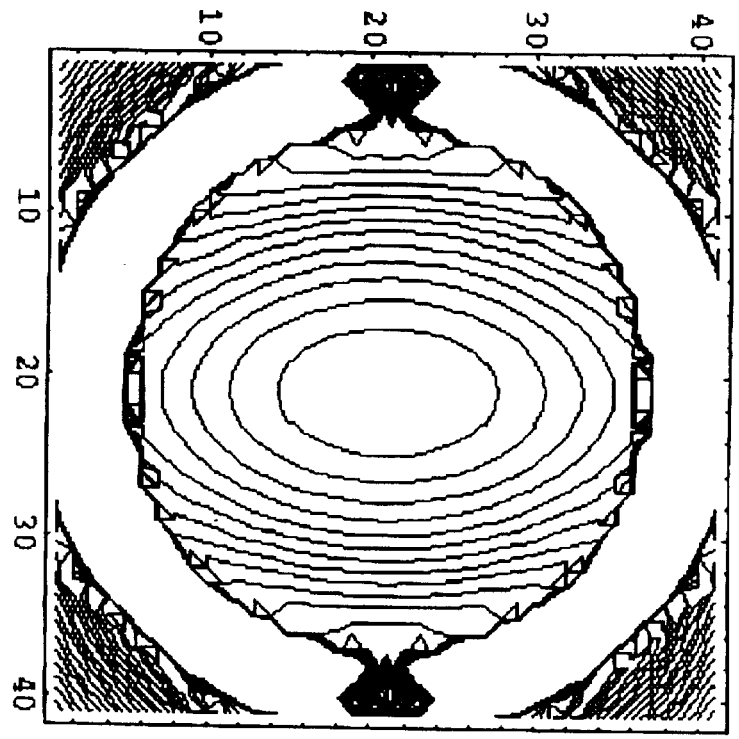
FIG. 20 is a diagram showing horizontal deflection magnetic field strength distribution of a conventional convergence yoke wherein winding density distribution is in proportion to $\cos \theta$.
Figure 21:
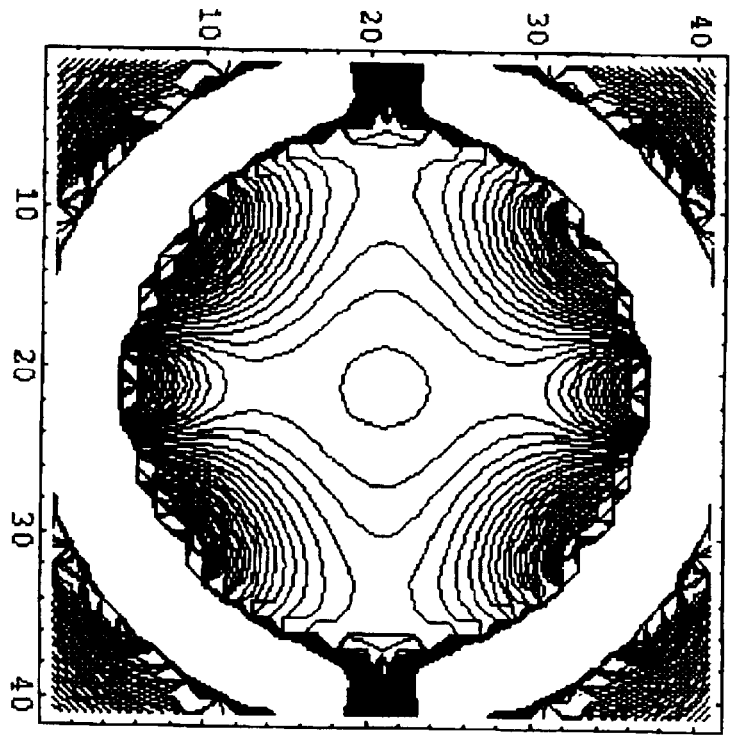
FIG. 21 is a diagram showing horizontal deflection magnetic field strength distribution of a conventional convergence yoke wherein winding is provided within a fixed angle range.
Figure 22:
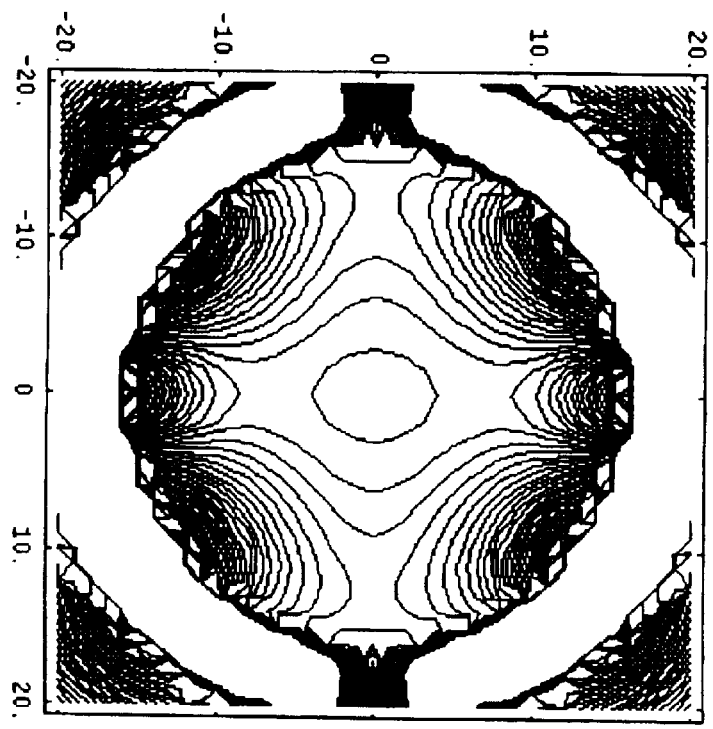
FIG. 22 is a diagram showing horizontal deflection magnetic field strength distribution of another convergence yoke having the same construction as stated above.
Figure 23:
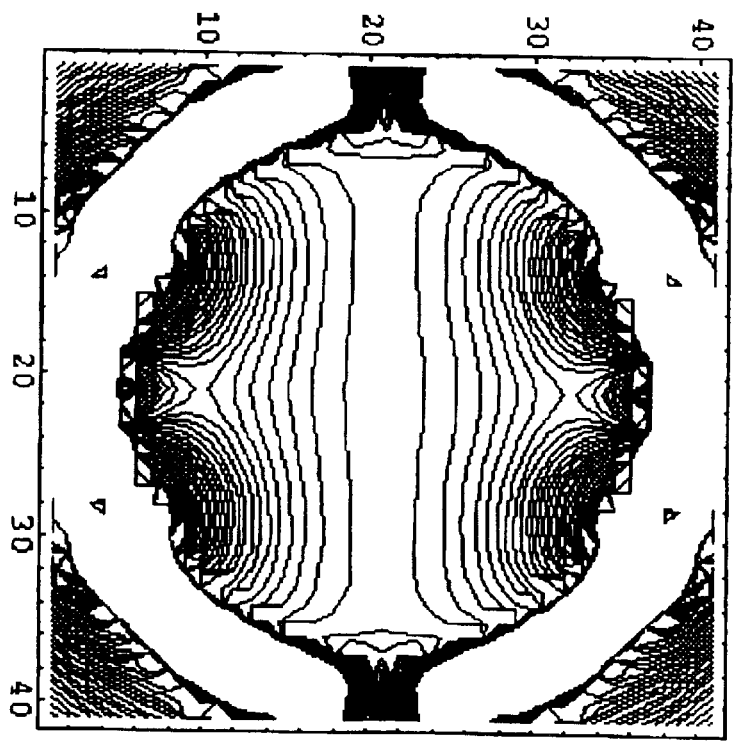
FIG. 23 is a diagram showing horizontal deflection magnetic field strength distribution of still another convergence yoke having the same construction as stated above.

Horizontal deflection magnetic field strength distribution is illustrated, when winding angle position is 10° shown in FIG. 12, when 20° in FIG. 13, when 25° in FIG. 14, when 27.5° in FIG. 15, when 30° in FIG. 16, when 35° in FIG. 17, when 40° in FIG. 18, and when 50° in FIG. 19, respectively. These Figures indicate that the horizontal deflection magnetic field strength distribution is approximately uniform in the range of 25° to 30° in winding angle position, and the horizontal deflection magnetic field strength distribution becomes most uniform at 27.5° in winding angle position. Thus a winding center is set in the range of 25° to 30° in winding angle θ from the reference axis 20, 30, and the winding is provided at winding density distribution in proportion to $\cos^2 \theta$ in the range of preceding and succeeding a fixed angle φ from the winding center as shown in FIG. 1, to thereby obtain approximately uniform magnetic field strength distribution.

Figure 7:
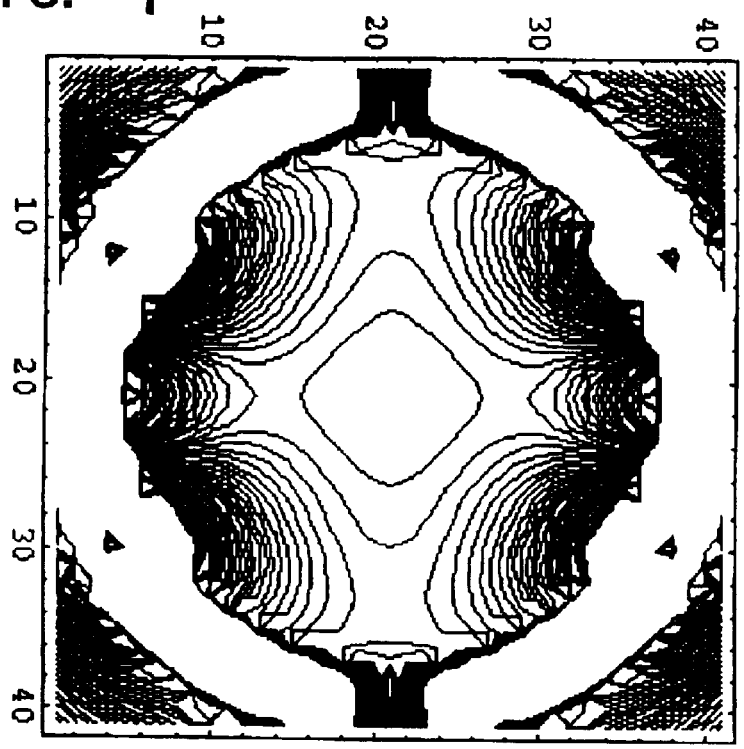
FIG. 7 is a diagram showing horizontal deflection magnetic field strength distribution of the convergence yoke of the invention wherein winding density distribution is in proportion to $\cos^2 \theta$ within the fixed angle range.
Figure 8:
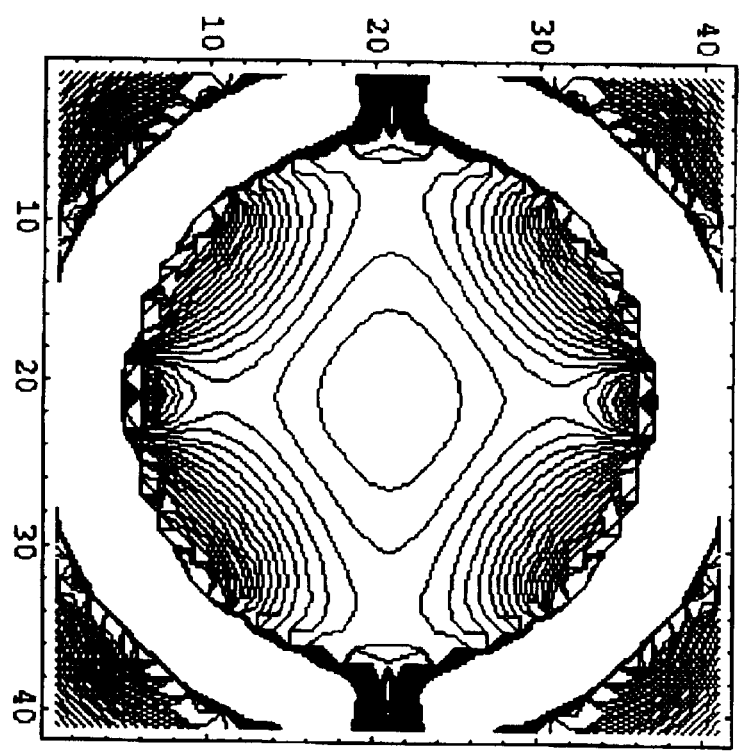
FIG. 8 is a diagram showing horizontal deflection magnetic field strength distribution of another convergence yoke having the same construction as stated above.

FIG. 7 shows horizontal deflection magnetic field strength distribution of the horizontal coil in the case where the winding is provided at winding density distribution in proportion to $\cos^2 \theta$ in the range of 27.5°±7.5° in winding angle θ. Further FIG. 8 shows horizontal deflection magnetic field strength distribution in the case where the winding is provided at winding density distribution in proportion to $\cos^2 \theta$ in the range of 27.5°±17.5° in winding angle θ. In either of the cases the horizontal deflection magnetic field strength distribution has diamond-shaped contour lines and the spacing between the contour lines is relatively broad. Vertical defection magnetic field strength distribution of the vertical coil is obtained by rotating 90° the horizontal deflection magnetic field strength distribution of the horizontal coil, so that superposing the horizontal and the vertical deflection magnetic field strength distributions does not narrow the range of the uniform magnetic field. As a result, when the electron beam is deflected by the horizontal coil 2 and the vertical coil 3 at the same time, the beam will not be distorted grossly.

In the case where the number of turns on the coil of the convergence yoke is small, it is difficult to provide the winding of the coil at winding density distribution in proportion to $\cos^2 \theta$. In this case each of the horizontal and the vertical coils 2, 3 is wound at fixed winding density X1 within the predetermined angle range (θs to θe) wherein a winding center is in the range of 25° to 30° in winding angle θ from the reference axis, and is wound at fixed winding density X2 within the angle range (0 to θs) wherein winding angle θ is from 0° to the predetermined angle range. Ratio of the winding density X2 relative to the winding density X1 is set in the range represented by an expression given below.

$$X2/X1 = ((\cos^2 \theta s - \cos^2 \theta e)/2\cos^2 \theta s) \pm 0.1$$

Figure 2:
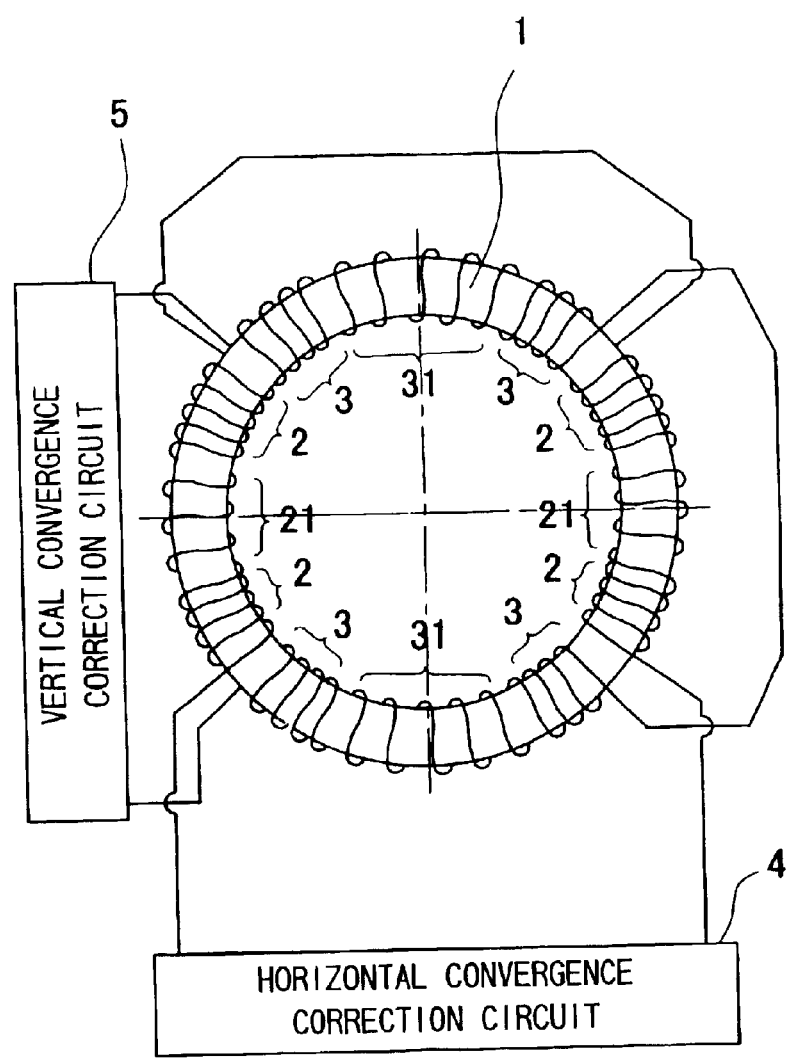
FIG. 2 is a diagram showing another convergence yoke embodying the present invention.

With said convergence yoke, a coil to be wound at winding density distribution in proportion to $\cos^2 \theta$ within the predetermined angle range (θs to θe) is wound at fixed winding density X1, causing an error which will be corrected by a coil (correction winding) wound at fixed winding density X2 within the angle range (0 to θs). FIG. 2 shows the state of winding of the described convergence yoke which comprises a correction winding 21 for the horizontal coil 2 and a correction winding 31 for the vertical coil 3 across neighboring two quadrants.

Figure 9:
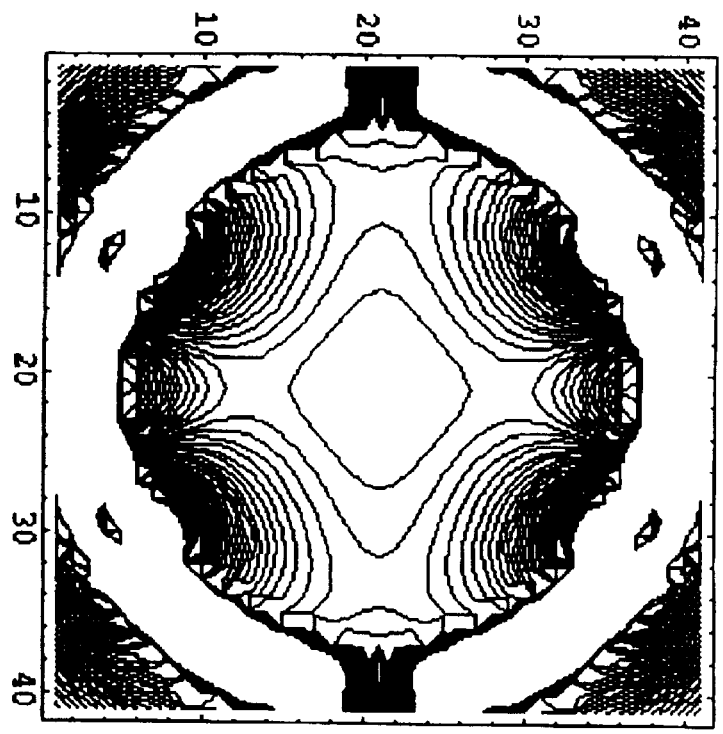
FIG. 9 is a diagram showing horizontal deflection magnetic field strength distribution of the convergence yoke of the present invention having uniform winding density distribution within a fixed angle range and having a correction winding.
Figure 10:
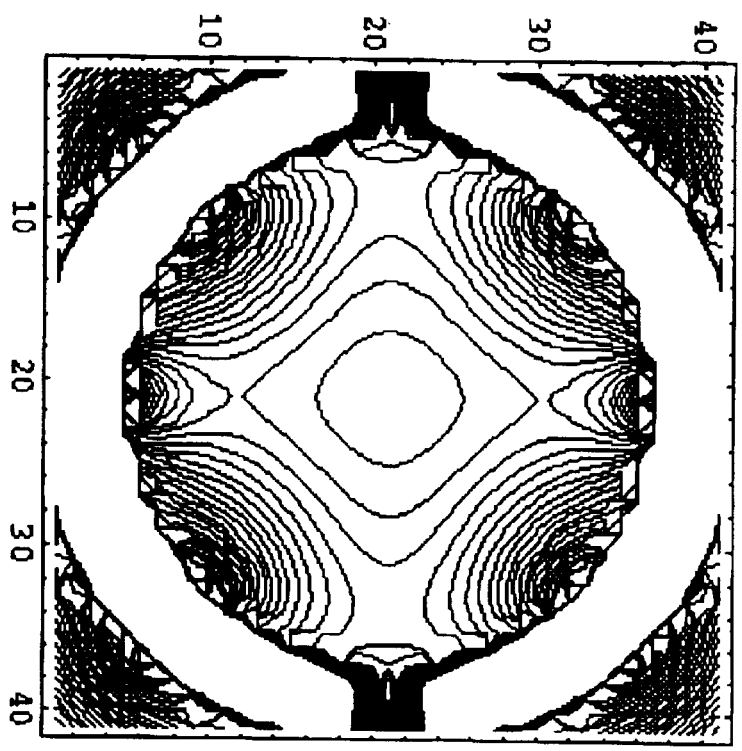
FIG. 10 is a diagram showing horizontal deflection magnetic field strength distribution of another convergence yoke having the same construction as stated above.

FIG. 9 indicates the calculation result of the horizontal deflection magnetic field strength distribution of a convergence yoke wherein the winding is provided at uniform density distribution in the range of 27.5°±7.5° in winding angle θ, and the correction winding is provided in the range of 0° to 20° in winding angle θ. FIG. 10 further indicates the calculation result of the horizontal deflection magnetic field strength distribution of a convergence yoke wherein the winding is provided at uniform density distribution in the range of 27.5°±17.5° in winding angle θ, and the correction winding is provided in the range of 0° to 10° in winding angle θ. In either of the convergence yokes the horizontal deflection magnetic field strength distribution which is approximately uniform and having diamond-shaped contour lines is obtained. Accordingly, if the horizontal and the vertical deflection magnetic field strength distributions are superposed, the range of the uniform magnetic field will not become narrow. Thus, when the electron beam is deflected by the horizontal coil 2 and the vertical coil 3 at the same time, the beam will not be distorted grossly.

Figure 11:
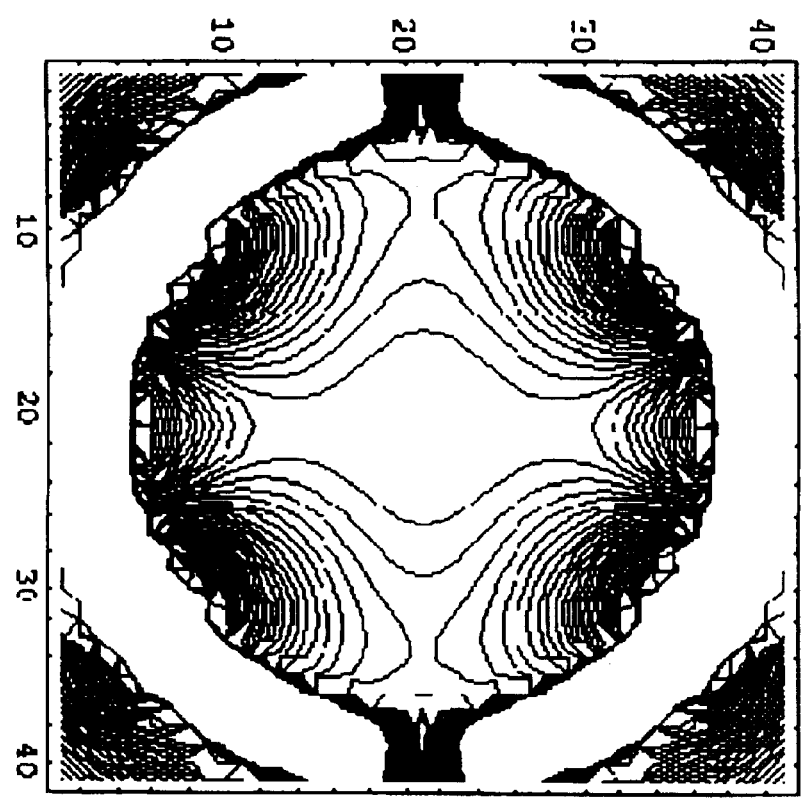
FIG. 11 is a diagram showing horizontal deflection magnetic field strength distribution of still another convergence yoke having the same construction as stated above.

Furthermore, FIG. 11 shows the calculation result of horizontal deflection magnetic field strength distribution of a convergence yoke wherein the winding is provided at uniform density distribution in the range of 30°±7.5° in winding angle θ, the correction winding is provided in the range of 0° to 22.5° in winding angle θ, and ratio X2/X1 of winding density according to the expression stated is set at 0.13. The convergence yoke also provides the horizontal deflection magnetic field strength distribution which is approximately uniform in the broad range.

Figure 3:
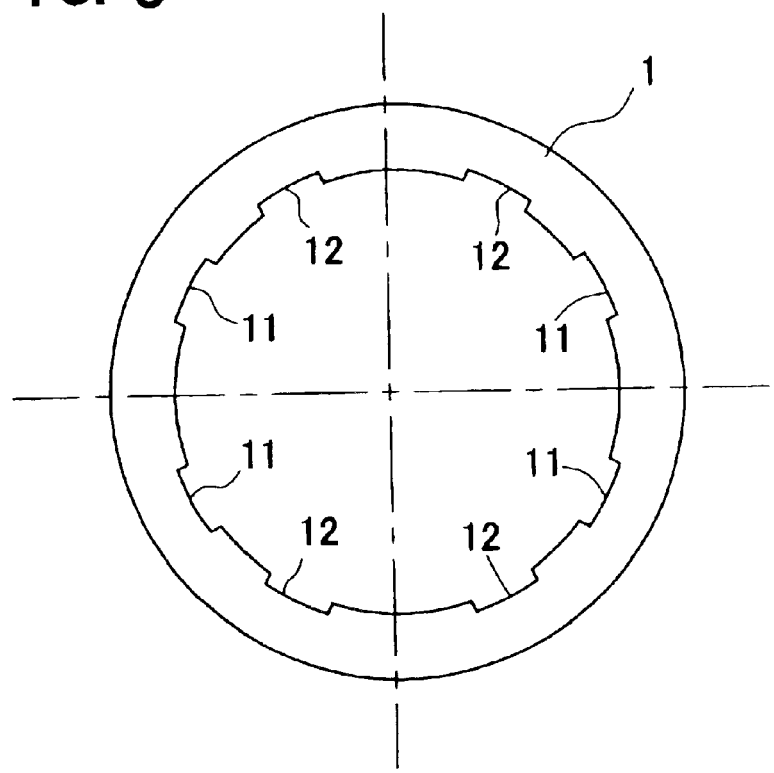
FIG. 3 is a plan view of a ring core.
Figure 4:
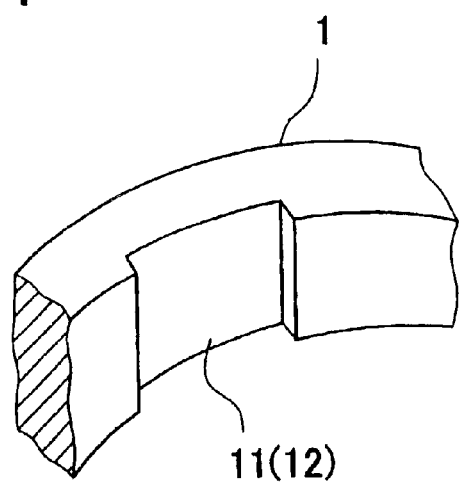
FIG. 4 is an enlarged fragmentary perspective view of the ring core.
Figure 5:
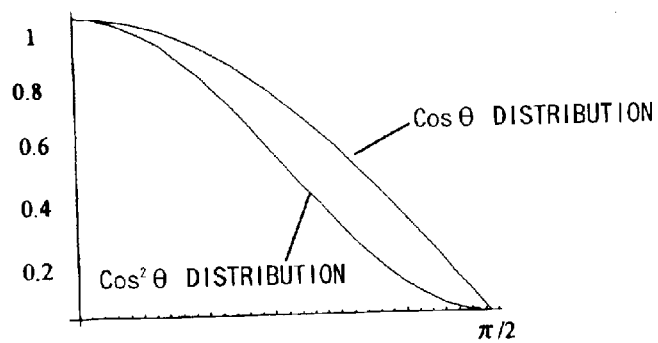
FIG. 5 is a graph showing comparison between the conventional and the present invention in winding density distribution.

As described above, with the convergence yoke embodying the present invention, the winding distribution wherein magnetic field strength distribution is more uniform than conventionally can be determined uniquely, suppressing the distortion of the electron beam caused by the deflection, to thereby improve focus performance. With the convergence yoke of the invention, it is effective that the ring core 1 has formed a horizontal coil winding groove 11 and a vertical coil winding groove 12, respectively, over the predetermined angle range for accurately determining the winding angle range of the horizontal and the vertical coils 2, 3 as shown in FIGS. 3 and 4.

What is claimed is:

1. A convergence yoke comprising a ring core having a plurality of coils wound therearound and producing two-pole magnetic field for deflecting an electron beam in a horizontal direction or in a vertical direction, wherein winding density distribution of each of the coils winding angle θ from a reference axis of the ring core is a is in proportion to $\cos^2 \theta$.

2. A convergence yoke according to claim 1 wherein the ring core 1 has wound therearound a horizontal coil 2 and a vertical coil 3 based on a horizontal coil reference axis 20 and a vertical coil reference axis 30 which are orthogonal to each other, and each of the two coils 2, 3 has the winding density distribution.

3. A convergence yoke according to claim 1 wherein the plurality of coils each comprises a plurality of coil portions, each of the coil portions is wound within a predetermined angle range wherein a winding center is in the range of 25° to 30° in winding angle θ from the reference axis on each of quadrants of orthogonal coordinates and has winding density distribution in proportion to $\cos^2 \theta$ within the angle range.

4. A convergence yoke comprising a ring core having a plurality of coils wound therearound and producing two-pole magnetic field for deflecting an electron beam in a horizontal direction or in a vertical direction, each of the plurality of coils comprising a plurality of coil portions, each of the coil portions being wound uniformly at a first winding density X1 within a predetermined angle range ($\theta s$ to $\theta e$) wherein a winding center is in the range of 25° to 30° in winding angle $\theta$ from a reference axis on each of quadrants of orthogonal coordinates and being wound uniformly at a second winding density X2 within an angle range (0 to $\theta s$) from 0° to the predetermined angle range in winding angle $\theta$, ratio of the second winding density X2 relative to the first winding density X1 being represented by an expression given below.

$$X2/X1 = ((\cos^2 \theta s - \cos^2 \theta e)/2 \cos^2 \theta s) \pm 0.1.$$

* * * * *

UNITED STATES PATENT AND TRADEMARK OFFICE
CERTIFICATE OF CORRECTION

PATENT NO. : 6,836,200 B2
DATED : December 28, 2004
INVENTOR(S) : Masahiko Miyazaki It is certified that error appears in the above-identified patent and that said Letters Patent is hereby corrected as shown below:

Column 6,
Line 50, change "coils winding" to be -- coils at winding --
Line 51, change "core is a is in proportion" to be -- core is in proportion --

Signed and Sealed this

Tenth Day of May, 2005

JON W. DUDAS
*Director of the United States Patent and Trademark Office*